United States Patent [19]

Stoller et al.

[11] 4,027,427
[45] June 7, 1977

[54] METHOD AND APPARATUS FOR THE PRODUCTION OF SPAWN

[76] Inventors: Benjamin B. Stoller, 1211 Fair Ave., Santa Cruz, Calif. 95061; John C. Azzolini, Jr., 411 Chatham St., Avondale, Pa. 19311

[22] Filed: July 16, 1976

[21] Appl. No.: 706,063

[52] U.S. Cl. .................................. 47/1.1; 215/261; 215/11 E; 195/127; 195/142; 206/439
[51] Int. Cl.² .......................................... A01G 1/04
[58] Field of Search ................ 215/11 E, 261; 150/DIG. 1; 47/1.1; 195/127, 139, 142, 54; 206/439

[56] References Cited

UNITED STATES PATENTS

| | | | |
|---|---|---|---|
| 1,914,353 | 6/1933 | Rettew | 47/1.1 |
| 2,851,821 | 9/1958 | Guiochon | 47/1.1 |
| 3,326,401 | 6/1967 | De Long | 195/139 X |
| 3,335,521 | 8/1967 | Sohm | 47/1.1 |
| 3,834,570 | 9/1974 | Barr | 215/11 E |
| 3,865,695 | 2/1975 | Massier | 195/142 X |

FOREIGN PATENTS OR APPLICATIONS

| | | | |
|---|---|---|---|
| 2,207,634 | 6/1974 | France | 47/1.1 |
| 25,682 | 7/1971 | Japan | 47/1.1 |
| 1,176,188 | 1/1970 | United Kingdom | 47/1.1 |

*Primary Examiner*—Robert E. Bagwill
*Attorney, Agent, or Firm*—Robert G. Slick

[57] ABSTRACT

A method and equipment to implement said method for the production of microbes on a solid or liquid substrate, particularly mushroom mycelium growing on a grain substrate, the latter known as "mushroom spawn", are provided wherein the spawn is grown in a transparent, heat sterilizable plastic bag with a temporary screw-on closure thereon. The finished spawn is prepared for market merely by removing the reusable temporary closure and closing the top of the plastic bag container.

4 Claims, 6 Drawing Figures

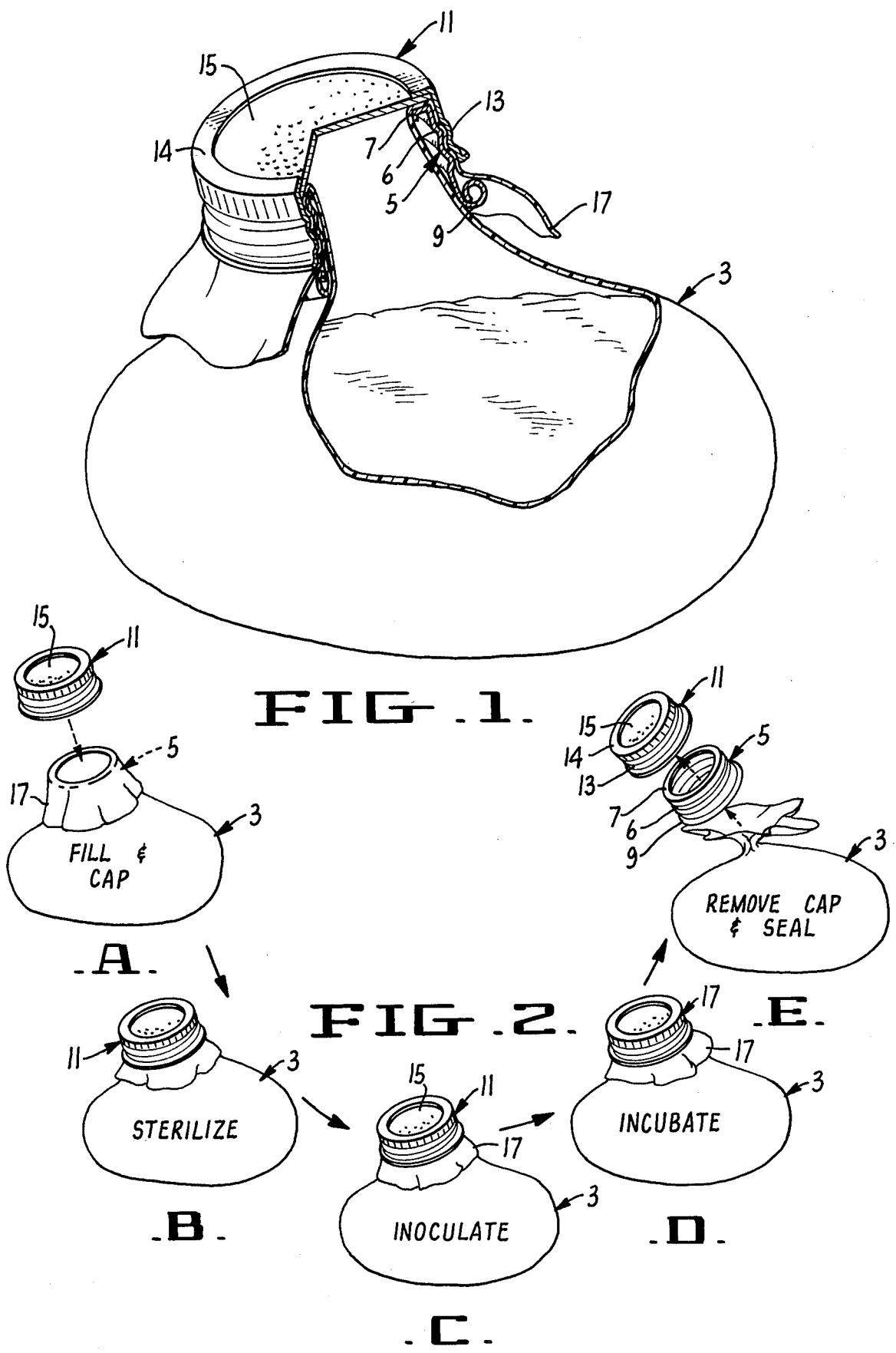

METHOD AND APPARATUS FOR THE PRODUCTION OF SPAWN

SUMMARY OF THE INVENTION

For the production of mushroom spawn, it has been customary in the past to place a substrate in a glass jar provided with a suitable cover, sterilize the jar and the substrate, inoculate the substrate, and after a suitable period of incubation, to transfer the contents of the jar to another container for the shipment of the spawn. Since it is necessary to prevent contamination from contact with microbes and spores of microbes in the air, the transfer of the spawn from one container to another involves some difficulty and there is always some danger of contamination.

In accordance with the present invention, an improved method of growing spawn is provided wherein the spawn is grown in a plastic bag. The plastic bag is provided with a temporary filtercover and when the growth process is complete, the temporary filtercover is removed for reuse and the top of the bag is merely folded over. Thus, it is not necessary to transfer the spawn from one vessel to another, avoiding the risk of contamination and also the difficulty and expense of handling the finished spawn.

Further, and in accordance with the present invention, a novel closure is provided for a plastic bag wherein a threaded collar is provided and the open end of the bag is passed through the open end of the collar and the edges of the bag are lapped over the edge of the collar and brought down. A mating closure is provided having complementary threads, said closure having a top with an inturned rim for retaining a filter between the rim and the top of the collar. The closure is screwed down over the plastic that covers the edge of the collar so that both the filter and the bag are clamped between the rim and the collar. The filter consists of a layer of cellulose - asbestos compressed to a layer approximately 1/32 to ¼ inch thick, and which is permeable to air but is not permeable to microbes. The filter fitted into the rim constitutes a "cap" or "lid". The removable collar and cap combination provide an easy way of filling the bag and maintaining sterility during the processing steps. This temporary closure is removed at the end of the incubation period and is suitable for reuse many times.

BRIEF DESCRIPTION OF THE DRAWINGS

In the drawings forming part of this application:

FIG. 1 is a perspective view of a plastic container and temporary closure, partly in section, embodying the present invention.

FIGS. 2A through 2E illustrates the series of steps of growing spawn in accordance with the process of the present invention.

DESCRITPION OF THE PRIOR ART

The closest known prior art is U.S. Pat. No. 2,851,821 wherein spawn is grown in a plastic bag. The bag is closed by turning the ends of the bag in, forming a chimney and it is sealed by placing a wad of cotton or the like in the chimney thus formed. In another embodiment, a tube is inserted in the top of the bag and the bag gathered around the tube with a string. A filter plug is then placed in the tube. It is difficult to form such a bag and particularly to inoculate it through the relatively narrow neck opening. Regardless of which method is used, there is always a possibility of contamination by microbes floating in the air around the insert and opening of the bag and especially around the filter plug closing the opening of the bag. The apparatus of the present invention provides a positive opening and closing neck so that it is easy to fill the bag and to later inoculate it after it has been sterilized. Also, the bag has a relatively wide mouth, making it easy to insert material within the bag. However, the greatest advantage of the present invention is a prevention of contamination by the bag overlaping the collar and also by the rim edge completely overlaping the mouth of the opening formed by the collar. In this manner, no air-borne microbes can be pushed into the bag when a filter plug is pushed into the mouth or chimney of the bag as is done in the French patent. The top collar and closure may be reused many times.

DESCRIPTION OF THE PREFERRED EMBODIMENTS

In accordance with the present invention, spawn is grown in a plastic bag generally designated 3. The plastic from which the bag is made is critical in that it must be non-porous, transparent (and not merely translucent) and must be heat sterilizable. One of the most suitable plastics for this purpose is polypropylene since it is transparent and is stable at 250° F. Other common plastics such as nylon or polyethylene are unsuitable since they do not have the necessary high-temperature stability and/or are highly porous to moisture.

In accordance with one aspect of the present invention, a novel temporary closure is provided. This consists of a collar generally designated 5 having a threaded side wall 6 with a top rim 7. Preferably the collar has a rolled bottom portion 9 to avoid any sharp edges. It will be understood that the collar 5 can advantageously be the shape and size of the top of a regular moth canning jar to provide a wide, easy to fill opening. A lid generally designated 11 is provided having threads 13 to mate with the threads 6 on the collar 5 and having a top, inturned lip 14 to mate with the rim 7. A filter 15 is held between the rim 7 and lip 14. The filter consists of a layer of cellulose-asbestos which has been compressed to form a layer approximately 1/32–1/4 inch thick and, of course, has a suitable diameter to fit within the confines of the inner surface of the lid 11. The filter must be permeable to air but not permeable to microbes.

The various steps necessary for the growing of the spawn are shown in FIGS. 2A through 2E. In FIG. 2A, a plastic bag 3 is filled with a suitable substrate, the collar 5 placed over the neck of the bag, and the bag folded down over the outside of the collar as is shown at 17. The cap 11 with filter 15 in place is then screwed down over the plastic bag and the collar so that the plastic bag extends beyond the bottom edge of the cap for 1 or 2 inches. The substrate employed may be any of substrates suitable for the growth of microbes including whole grains or ground substrates such as those described in my prior U.S. Pat. No. 3,828,470 or liquid media.

At 2B, the filled bag cap is sterilized under conditions which are usual, such as 250° F or or 15 pounds steam pressure for a period of time appropriate with the nature and amount of substrate. After sterilization, the bag and contents are cooled.

At 2C, the contents of the bag are inoculated with the desired microbe such as mushroom mycelium. The inoculation is performed by unscrewing the cap, inserting the inoculum, and then screwing the cap back onto the collar. Naturally this is done under aseptic conditions.

At 2D, the bag and contents are incubated for a desired length of time and temperature for the growth of the mycelium on the substrate.

The contents of the bag are now suitable for the sale and, as is shown in FIG. 2E, the collar and cap assembly is removed for reuse while the bag is closed in a suitable manner, e.g. by folding it over. The spawn can be stored and shipped in the plastic bag so that it is not necessary to transfer the contents and thus the chance of contamination is avoided. For distance shipment the spawn is precooled at temperatures down to 34° F. Also, the plastic bag provides a very inexpensive and substantially break-proof shipping container.

Although the method and apparatus were developed primarily for the growing of mushroom spawn, it is obvious that the method and apparatus can be used for any application wherein microbes or tissues are grown on a solid or liquid substrate.

It will be obvious to those skilled in the art that may variations can be made in the exact apparatus and process shown without departing from the spirit of this invention.

We claim:

1. A microbe culture bag comprising in combination:
   a. a threaded collar having an open top and bottom;
   b. a cap for said collar, said cap having mating threads with said collar;
   c. said cap having a top center portion provided with a filter porous to air but not to most microbes; and
   d. a plastic, moisture impervious transparent, heat sterilizable bag inserted through said collar and brought back over the outside of said collar and said cap is screwed over said collar to provide a temporary closure for the plastic bag wherein microbes inoculated on the substrate in the bag can breathe through said porous filter.

2. The method of growing micro-organisms, tissues and mycelium comprising the following steps:
   a. providing a threaded collar having an open top and bottom and with an inturned top rim;
   b. providing a cap for said collar, said cap having a largely open top portion with an inturned lip mating with said rim;
   c. providing a filter porous to air but not porus to microbes, said filter fitting between said rim and said lip;
   d. providing a plastic bag, said bag being made of a transparent, heat-sterilizable moisture impervious material;
   e. passing the open mouth of said bag upwardly through said collar and down over the outside thereof;
   f. placing a suitable substrate in said plastic bag and placing said filter on the top rim of said collar and screwing said cap over both the filter and top of the plastic bag;
   g. sterilizing and inoculating the contents of said bag;
   h. growing a member selected from the group consisting of organisms, tissues and mycelia on said substrate;
   i. removing said collar and said cap from said bag to provide a plastic bag containing said micro-organisms, tissues or mycelium and closing the top of said bag.

3. The process of claim 2 wherein the plastic bag is composed of polypropylene.

4. The process of claim 2 wherein mushroom spawn is grown in the bag

* * * * *